United States Patent [19]
Nakanishi et al.

[11] Patent Number: 5,832,138
[45] Date of Patent: Nov. 3, 1998

[54] IMAGE PROCESSING METHOD AND APPARATUS FOR EXTRACTING LINES FROM AN IMAGE BY USING THE HOUGH TRANSFORM

[75] Inventors: Mamoru Nakanishi, Isehara; Takeshi Ogura, Atsugi, both of Japan

[73] Assignee: Nippon Telegraph and Telephone Corporation, Tokyo, Japan

[21] Appl. No.: 396,700

[22] Filed: Mar. 1, 1995

[30] Foreign Application Priority Data

Mar. 7, 1994 [JP] Japan ................................. 6-035798

[51] Int. Cl.$^6$ .............................. G05F 17/14; G06K 9/36
[52] U.S. Cl. ........................................... 382/281; 382/199
[58] Field of Search ................................... 382/199, 202, 382/203, 281, 287, 104, 240, 266, 200, 289, 295, 296, 141, 143, 151, 153; 364/424.033, 424.07, 725; 348/135, 120; 358/426

[56] References Cited

U.S. PATENT DOCUMENTS

| 4,906,099 | 3/1990 | Casasent | 382/143 |
|---|---|---|---|
| 5,220,615 | 6/1993 | Ishii | 382/281 |
| 5,359,666 | 10/1994 | Nakayama | 382/199 |
| 5,365,600 | 11/1994 | Nagaishi | 382/281 |
| 5,379,353 | 1/1995 | Hasegawa | 382/281 |
| 5,430,810 | 7/1995 | Saeki | 382/281 |
| 5,629,989 | 5/1997 | Osada | 382/281 |

FOREIGN PATENT DOCUMENTS 3-201078 9/1991 Japan .
6-103378 4/1994 Japan .

OTHER PUBLICATIONS

"Computing the Hough Transform on a Scan Line Array Processor" by Allan L. Fisher and Peter T. Highnam; IEEE vol. 11 No. 3, Mar. 1989.

"The Hough Transform Has O(N) Complexity on SIMD N X N Mesh Array Architectures", R.E. Cypher et al, IEEE Workshop on Computer Architecture for Pattern Analysis and Machine Intelligence (CAPAMI 87) pp. 116–120.

"Associative Processing and Processors", Anargyros Krikeles, et al, Computer (IEEE) Nov. 1994, pp. 12–17.

"A 20–kbit Associative Memory LSI for Artificial Intelligence Machines", Takeshi Ogura, et al, IEEE Journal of Solid–State Circuits, vol. 24, No. 4, Aug. 1989, pp. 1014–1020.

VK Jain, Image Processing Using a Universal Nonlinear Cell, IEEE, 1994.

Ze–Nian Li, Parallel Algorithms for Line Detection on a lxN Array Processor, Proceedings of the 1991 IEEE Int. Conf. on Robotics and Automation, Sacremento, CA, Apr. 1991.

*Primary Examiner*—Dwayne Bost
*Assistant Examiner*—Brian L. Johnson
*Attorney, Agent, or Firm*—Frishauf, Holtz, Goodman, Langer & Chick, P.C.

[57] ABSTRACT

An image processing apparatus for extracting lines from an image using the Hough transform. A processor element is assigned to each quantization point in a Hough space. Each processor element calculates, for each scanning line of the image, intersections of the scanning line and the line corresponding to this processor element once per scanning line. A black pixel (a Hough transform object point) on the scanning line is also obtained sequentially. The coordinate values of the intersection are compared with those of the Hough transform object point, and when they agree, voting to a ballot box memory of the processor element is performed. The voting results become Hough transform data. This makes it possible to implement a high speed Hough transform, and to reduce the size of the apparatus.

6 Claims, 15 Drawing Sheets

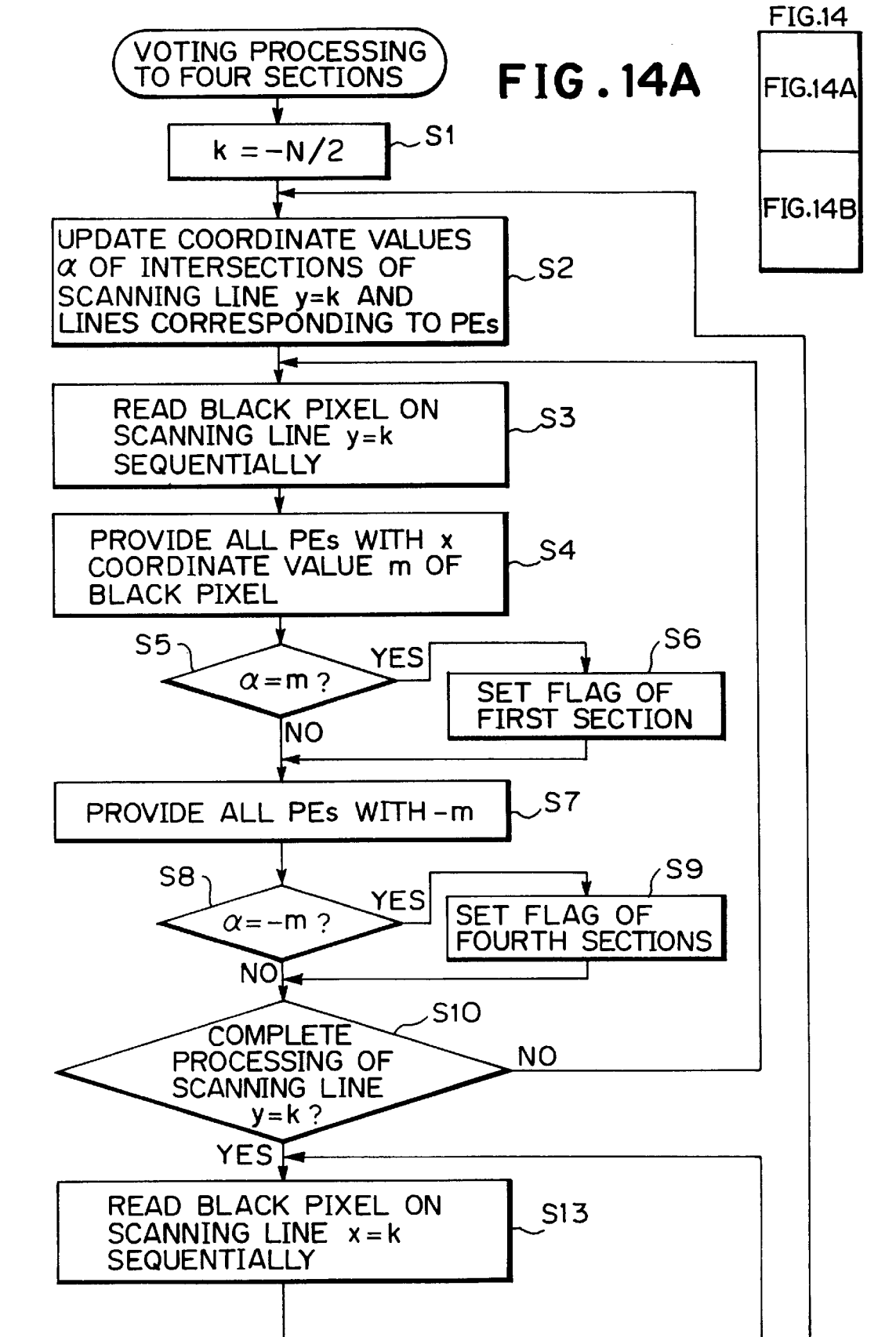

IMAGE PROCESSING METHOD AND APPARATUS FOR EXTRACTING LINES FROM AN IMAGE BY USING THE HOUGH TRANSFORM

BACKGROUND OF THE INVENTION

1. Field of the Invention

The present invention relates to an image processing method and apparatus for extracting lines from an image by using the Hough transform, the image being inputted by a video camera or the like.

2. Description of Related Art

FIG. 1A illustrates the principle of the Hough transform. In FIG. 1A, the line is expressed as $$\rho = x \cos\theta + y \sin\theta \quad (1)$$

where $\rho$ is the length of the unique chord from the origin perpendicular to the line, and $\theta$ is the angle of that chord from the positive x axis.

The line in FIG. 1A is obtained by changing (x, y) while fixing $\rho$ and $\theta$. Thus, the point $(\rho,\theta)$ has a one-to-one correspondence with the line. A $\rho$–$\theta$ plane is called a Hough space, and the mapping of the line expressed by equation (1) from the x-y plane to the point $(\rho,\theta)$ in the Hough space is called the Hough transform. On the other hand, changing $(\rho,\theta)$ while fixing (x, y) will give a curve in the Hough space. Accordingly, performing Hough transform on respective points on the line will give a plurality of curves in the Hough space as shown in FIG. 1B, and these curves intersect at one point which corresponds to the line.

Utilizing this characteristic of the Hough transform makes it possible to extract given lines in an image. More specifically, the transformed points will form peaks in the Hough space by performing the Hough transform on individual black pixels in the image, and then by accumulating (voting) the point sequences $(\rho, \theta)$ thus obtained. Detection of these peaks will give all the lines in the image.

Since the line extraction processing using the Hough transform is one of the statistical processings, the peak points themselves little change their positions even if their contrast is reduced by noise. Therefore, the Hough transform is characterized in that it can extract lines at high accuracy.

The following conventional techniques are known in this field.

(1) A. L. Fisher, and P. T. Highnam, "Computing the Hough Transform on a Scan Line Array Processor", IEEE Transactions on Pattern Analysis and Machine Intelligence, VOL. II, No. 3, pp. 262–265, 3 Mar., 1989.

This conventional technique employs a one-dimensional processor array including the same number of processors as that of pixels on a side of an input image. The data on a line of the image is inputted to the processor array, and individual processors count the number of black pixels by voting to a ballot box transferred through the processors. By repeating this operation, the Hough transform is carried out. The ballot box is transferred in the direction of $\theta$ after incrementing the angle $\theta$ sequentially by a small amount.

(2) R. E. Cypher, J. L. C. Sanz, and L. Synder, "The Hough Transform Has O(N) Complexity On SIMD N×N Mesh Array Architectures", IEEE Workshop on Computer Architecture for Pattern Analysis and Machine Intelligence pp. 115–121, 1987.

This conventional technique employs a two-dimensional processor array having the same number of processors as that of pixels in an input image. In contrast with the conventional technique (1) which handles the data sequentially with respect to the angle $\theta$, this technique deals with the data by pipeline processing with respect to $\theta$. It is similar to the conventional technique (1) in that the voting is performed while transferring a ballot box.

(3) U.S. Pat. No. 5,220,615.

This prior art employs a one-dimensional processor array including the same number of processors as the number of $\theta$'s in the Hough space. This technique calculates values $\rho$ from values $\theta$ and the coordinate values of black pixels in an image, and votes to memory cells indicated by $(\rho,\theta)$. Since $\eta$ is expressed by equation (1), the calculation of $\rho$ can be performed by only adding $\cos\theta$ or $\sin\theta$ in accordance with a scanning direction of an image. This technique has a drawback, however, in that an amount of the calculation of $\rho$ is enormous because the calculation must be performed for all pixels.

(4) Japanese Patent Application Laid-Open No. 6-103378 (1994).

This conventional technique provides each accumulator cell in the Hough space with one word of a CAM (Content Addressable Memory). Each word decides whether or not a line corresponding to the word passes through a black pixel on the image space by calculating the distance between the line and the black pixel, and performs a voting processing based on the calculation result. The distance d is given by $$d = |x \cos\theta + y \sin\theta - \rho|$$

Voting is performed when the distance d thus calculated is lower than a predetermined value. This provides the voting with a certain allowable range. In addition, high speed processing can be expected because it employs a CAM as a memory of the two-dimensional Hough space, the CAM being used as a processor array that performs parallel processing.

The conventional technique (4), however, has a problem in that it must perform the same number of additions as the number of pixels in an image because the distance d is calculated for each pixel. In other words, it requires a processing time proportional to the square of N, where N is the number of pixels on one side of the image.

Moreover, since it requires the same number of processor elements or CAM words as the number of the accumulator cells in the Hough space, a large scale of hardware becomes necessary.

SUMMARY OF THE INVENTION

It is therefore an object of the present invention to provide an image processing method and apparatus for extracting lines from an image by using the Hough transform, which can implement a high speed Hough transform processing, and/or downsizing of hardware.

In a first aspect of the present invention, there is provided an image processing apparatus for extracting a line in an image space by using the Hough transform which maps a line in the image space onto one point on a Hough space, the image processing apparatus comprising:

a plurality of processor elements, each of which is assigned to one of accumulator cells of the Hough space, each of the accumulator cells corresponding to one of quantization points in the Hough space; and means for sequentially reading a pixel on a scanning line in the image space, the means making decision whether or not the pixel is a Hough transform object point having a value other than zero, and supplying the respective processor elements with coordinate values of the pixel when the pixel is the Hough transform object point, wherein each of the processor elements includes:
a ballot box memory for storing the number of votes;
means for obtaining, for each scanning line, coordinate values of an intersection of the scanning line and a line corresponding to the accumulator cell associated with this processor element;
means for comparing coordinate values of the Hough transform object point with the coordinate values of the intersection;
means for memorizing, as a compared result, agreement or disagreement of the coordinate values of the Hough transform object point with the coordinate values of the intersection; and
means for voting to the ballot box memory only when the coordinate values of the Hough transform object point agree with the coordinate values of the intersection, the voting being performed after the compared result has been obtained for each pixel on the scanning line,
and wherein a line is extracted which corresponds to an accumulator cell whose ballot box memory takes a peak value of the number of votes, after all the scanning lines of the image space have been processed.

Here, each of the processor element may consist of one word of a CAM (Content Addressable Memory).

In a second aspect of the present invention, there is provided an image processing apparatus for extracting a line in an image space by using the Hough transform which maps a line expressed by $\rho=x\cos\theta+y\sin\theta$ (where $\rho$ is the length of a unique chord from an origin perpendicular to the line, and $\theta$ is an angle of the chord from a positive x axis) in the image space onto one point ($\rho$, $\theta$) on a Hough space, the image processing apparatus comprising:
a plurality of processor elements, each of which is disposed on one of accumulator cells of a first section of the Hough space which is divided into a first section ($0 \leq \theta < \pi/4$), a second section ($\pi/4 \leq \theta < 90\ /2$), a third section ($\pi/2 \leq \theta < 3\pi/4$) and a fourth section ($3\pi/4 \leq \theta < \pi$) in accordance with a value of $\theta$, each of the accumulator cells corresponding to one of quantization points in the Hough space; and
control means for sequentially reading, with regard to a line group corresponding to accumulator cells of the first section, a pixel on a horizontal scanning line along an x axis in the image space, for making decision whether or not the pixel is a Hough transform object point having a value other than zero, and for providing the respective processor elements with an x coordinate value m of the pixel when the pixel is the Hough transform object point, the control means providing, with regard to a line group corresponding to accumulator cells of the fourth section, each of the processor elements with a value −m obtained by inverting the sign of the x coordinated value m, the control means sequentially reading, with regard to a line group corresponding to accumulator cells of the second section, a pixel on a vertical scanning line along a y axis in the image space, making decision whether or not the pixel is a Hough transform object point having a value other than zero, and providing the respective processor elements with a y coordinate value n of the pixel when the pixel is the Hough transform object point, the control means providing, with regard to a line group corresponding to accumulator cells of the third section, each of the processor elements with a value −n obtained by inverting the sign of the y coordinated value n;
wherein each of the processor elements is associated with four accumulator cells which belong to the first section, second section, third section and fourth section, respectively, and includes:
a first ballot box memory corresponding to a first section, the first ballot box storing the number of votes to the accumulator cell in the first section, which accumulator cell corresponds to this processor element;
a second ballot box memory corresponding to a second section, the second ballot box storing the number of votes to the accumulator cell in the second section, which accumulator cell corresponds to this processor element;
a third ballot box memory corresponding to a third section, the third ballot box storing the number of votes to the accumulator cell in the third section, which accumulator cell corresponds to this processor element;
a fourth ballot box memory corresponding to a fourth section, the fourth ballot box storing the number of votes to the accumulator cell in the fourth section, which accumulator cell corresponds to this processor element;
calculation means for obtaining, for an initial scanning line along the x axis, a value of $\alpha=\rho/\cos\theta-k\tan\theta$ as a coordinate value of an intersection of the initial scanning line and a line corresponding to the accumulator cell associated with this processor element;
first comparing means for comparing, with regard to a line corresponding to the accumulator cell in the first section, the coordinate value m of the Hough transform object point with the coordinate value $\alpha$ of the intersection;
first memory means for memorizing, with regard to the line corresponding to the accumulator cell in the first section, agreement or disagreement of the value m with the value $\alpha$ as a compared result of comparing the m with the $\alpha$;
second comparing means for comparing, with regard to a line corresponding to the accumulator cell in the second section, the coordinate value n of the Hough transform object point with the coordinate value $\alpha$ of the intersection;
second memory means for memorizing, with regard to the line corresponding to the accumulator cell in the second section, agreement or disagreement of the value n with the value $\alpha$ as a compared result of comparing the n with the $\alpha$;
third comparing means for comparing, with regard to a line corresponding to the accumulator cell in the third section, the coordinate value −n obtained by inverting the sign of the coordinate value n of the Hough transform object point with the coordinate value $\alpha$ of the intersection;
third memory means for memorizing, with regard to the line corresponding to the accumulator cell in the third section, agreement or disagreement of the value −n with the value $\alpha$ as a compared result of comparing the −n with the $\alpha$;
fourth comparing means for comparing, with regard to a line corresponding to the accumulator cell in the fourth section, the coordinate value −m obtained by inverting the sign of the coordinate value m of the Hough transform object point with the coordinate value $\alpha$ of the intersection;
fourth memory means for memorizing, with regard to the line corresponding to the accumulator cell in the fourth section, agreement or disagreement of the value −m with the value α as a compared result of comparing the −m with the α; and means for voting, after the compared results have been obtained for each pixel on the first and second scanning lines, to the first ballot box memory only when m=α, to the second ballot box memory only when n=α, to the third ballot memory only when −n=α, and to the fourth ballot memory only when −m=α, and wherein a line is extracted which corresponds to an accumulator cell whose ballot box memory takes a peak value of the number of votes, after all the scanning lines in the image space have been processed.

Here, each of the processor element may consist of one word of a CAM.

In a third aspect of the present invention, there is provided an image processing method for extracting a line in an image space by using the Hough transform which maps a line in the image space onto one point on a Hough space, the method being provided with a plurality of processor elements, each of which is disposed on one of accumulator cells corresponding to quantization points of the Hough space, the method comprising the step of:

sequentially reading a pixel on a scanning line in the image space;

making decision whether or not the pixel is a Hough transform object point having a value other than zero;

supplying the respective processor elements with coordinate values of the pixel when the pixel is the Hough transform object point;

obtaining, in each of the processor elements, for each scanning line, coordinate values of an intersection of the scanning line and a line corresponding to the accumulator cell associated with the processor element;

comparing, in each of the processor elements, coordinate values of the Hough transform object point with the coordinate values of the intersection;

memorizing, in each of the processor elements, a a compared result, agreement or disagreement of the coordinate values of the Hough transform object point with the coordinate values of the intersection;

voting, in each of the processor elements, to a ballot box memory of each of the processor elements only when the coordinate values of the Hough transform object point agree with the coordinate values of the intersection, after the compared result has been obtained for respective pixels on the scanning line; and extracting a line which corresponds to an accumulator cell whose ballot box memory takes a peak value of the number of votes, after all the scanning lines in the image space have been processed.

In a fourth aspect of the present invention, there is provided an image processing method for extracting a line in an image space by using the Hough transform which maps a line expressed by ρ=xcosθ+ysinθ (where ρ is the length of a unique chord from an origin perpendicular to the line, and θ is an angle of the chord from a positive x axis) in the image space onto one point (ρ, θ) on a Hough space, the method being provided with a plurality of processor elements, each of which is disposed on one of accumulator cells of a first section of the Hough space which is divided into a first section (0≦θ<π/4), a second section (π/4≦θ<π/2), a third section (π/2≦θ<3π/4) and a fourth section (3π/4≦θ<π) in accordance with a value of θ, each of the processor elements being provided with a first ballot box memory associated with the first section, a second ballot box memory associated with the second section, a third ballot box memory associated with the third section, and a fourth ballot box memory associated with the fourth section, each of he accumulator cells corresponding to one of quantization points in the Hough space, the method comprising the steps of:

obtaining, in each of the processor elements, a value of a α=ρ/cosθ−ktanθ for an initial scanning line along the x axis as a coordinate value of an intersection of the initial scanning line and a line corresponding to the accumulator cell associated with the processor element;

sequentially reading a pixel on a horizontal scanning line along the x axis in the image space;

making decision whether or not the pixel is a Hough transform object point having a value other than zero;

providing the respective processor elements with an x coordinate value m of the pixel when the pixel is the Hough transform object point;

comparing, in each of the processor elements, the coordinate value m of the Hough transform object point with the coordinate value α of the intersection;

memorizing, in each of the processor elements, agreement or disagreement of the value m with the value α;

providing the respective processor elements with a value −m obtained by inverting the sign of the x coordinated value m;

comparing, in each of the processor elements, the coordinate value −m with the coordinate value α of the intersection;

memorizing, in each of the processor elements, agreement or disagreement of the value −m with the value α;

sequentially reading a pixel on a vertical scanning line along a y axis in the image space;

making decision whether or not the pixel is a Hough transform object point having a value other than zero;

providing the respective processor elements with a y coordinate value n of the pixel when the pixel is the Hough transform object point;

comparing, in each of the processor elements, the coordinate value n of the Bough transform object point with the coordinate value α of the intersection;

memorizing, in each of the processor elements, agreement or disagreement of the value n with the value α;

providing the respective processor elements with a value −n obtained by inverting the sign of the y coordinated value n;

comparing, in each of the processor elements, the coordinate value −n with the coordinate value α of the intersection;

memorizing, in each of the processor elements, agreement or disagreement of the value −n with the value α;

voting, in each of the processor elements after the comparing steps have all been completed, to the first ballot box memory only when m=α, to the second ballot box memory only when n=α, to the third ballot memory only when −n=α, and to the fourth ballot memory only when −m=α; and extracting a line which corresponds to an accumulator cell whose ballot box memory takes a peak value of the number of votes, after all the scanning lines in the image space have been processed.

The present invention calculates, once for each scanning line, intersections of the scanning line and lines represented by individual quantization points (accumulator cells) in the Hough space, sequentially obtains the coordinate values of black pixels (Hough transform object points) on the scanning line, compares the coordinate values of the black pixel with the coordinate values of all the intersections at the same time, and stores the agreement/disagreement of these coordinate values. Subsequently, after completing all the comparing processings with the scanning line, the numbers of votes of respective accumulator cells which correspond to the lines having intersection coordinate values identical to the black pixel coordinate values are incremented simultaneously. After all the processings of the scanning line have been completed, similar processings are repeated with the next scanning line.

According to the present invention, the calculation for obtaining the coordinate values of the intersections can be achieved by a single adding operation per scanning line. Therefore, the present invention can reduce the number of adding operations by a factor of N (N is the number of pixels on a scanning line) as compared with the conventional techniques (3) and (4) which require one adding operation per pixel, thereby speeding up the processings.

Furthermore, since the functions handled by the processor elements or the CAM are trigonometric functions having symmetry, the number of processor elements or that of words of the CAM can be reduced by a factor of four by utilizing the symmetry.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 14A and 14B are flowcharts illustrating the operation of the third embodiment.

DETAILED DESCRIPTION OF PREFERRED EMBODIMENTS

The invention will now be described with reference to the accompanying drawings. In the following description, it is assumed that lines are extracted from an image consisting of N×N binary pixels.

EMBODIMENT 1

Figure 1A:
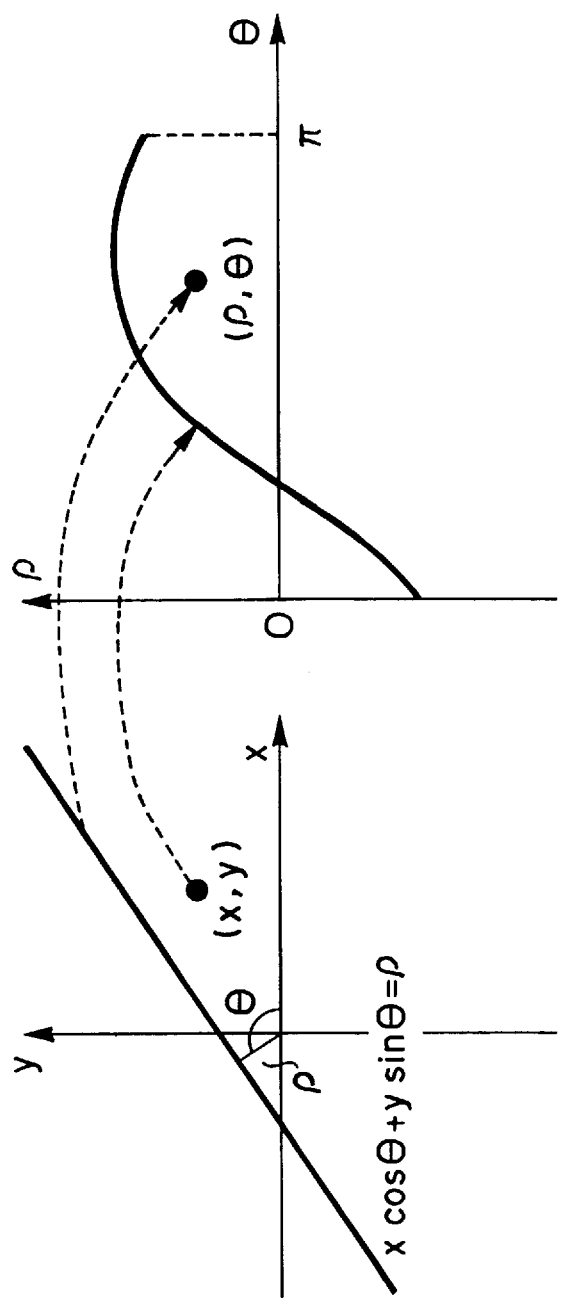
FIGS. 1A and 1B are diagrams illustrating the principle of the Hough transform.
Figure 1B:
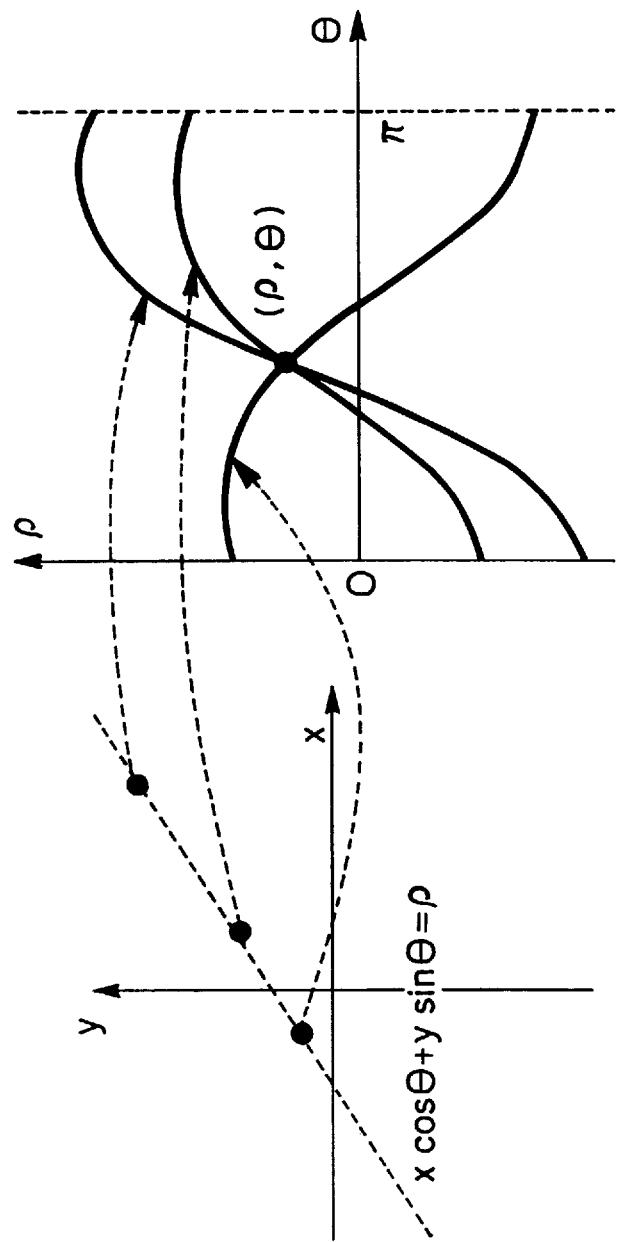
Figure 2B:
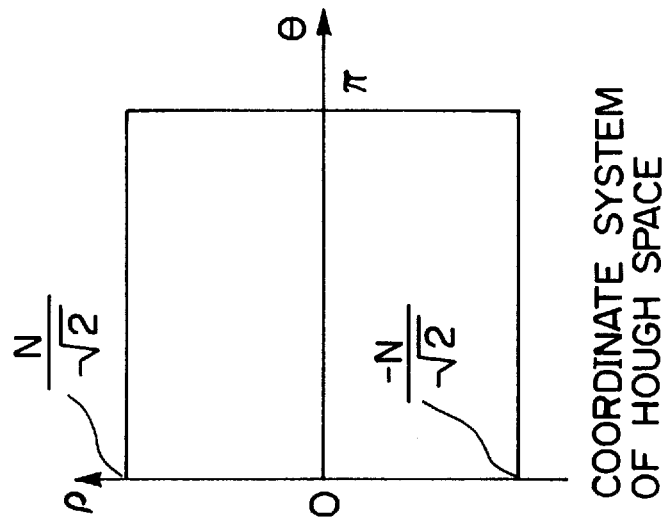
FIGS. 2A and 2B are diagrams showing an image space coordinate system and a Hough space coordinate system, respectively.
Figure 2A:
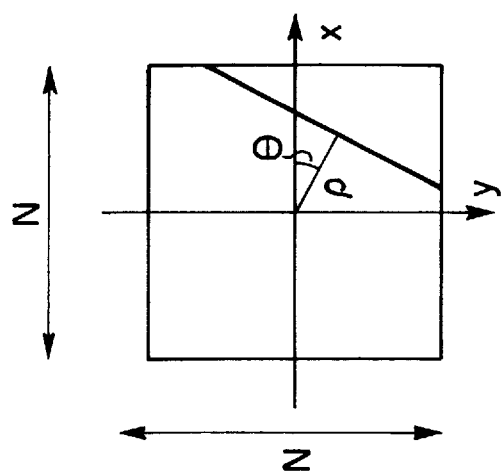

FIG. 2A shows a coordinate system of the image space, and FIG. 2B shows that of the Hough space.

The image space coordinate system has its origin at the center of the image space, and the horizontal right direction is set as the positive x axis, and the vertical downward direction is set as the positive y axis. On the other hand, the Hough space coordinate system consists of an axis of abscissas $\theta$, and an axis of ordinates $\rho$ as shown in FIG. 2B. The resolution of the Hough space coordinate system is set as one degree with regard to $\theta$, and as identical to the resolution of the image with regard to $\rho$. In this case, the Hough space capable of handling the entire lines in an image is defined as a range of $0 \leq \theta < \pi$, and $-N/\sqrt{2} \leq \rho < N\sqrt{2}$.

Figure 3:
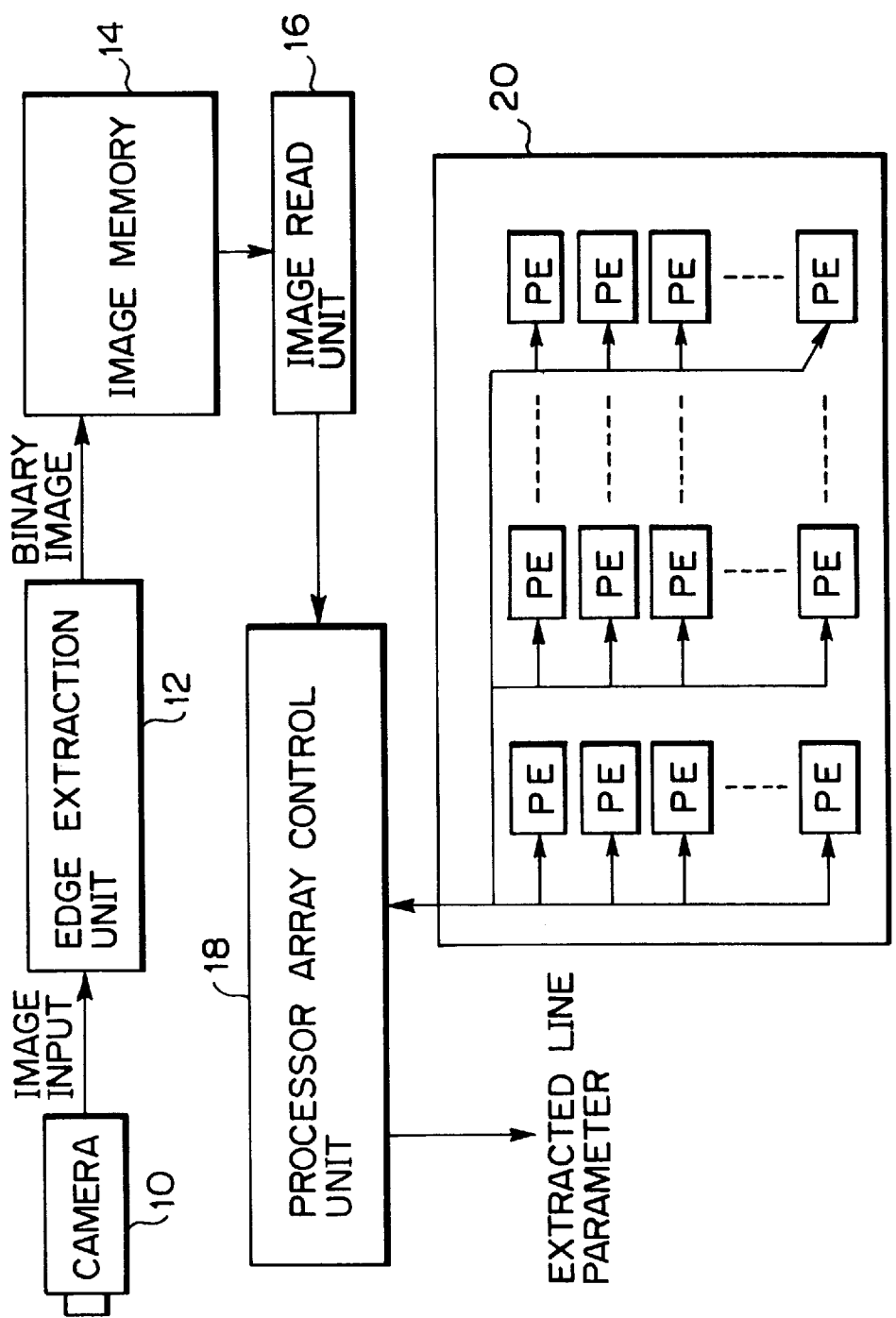
FIG. 3 is a block diagram showing a first embodiment of an image processing apparatus for extracting lines by using the Hough transform in accordance with the present invention.

FIG. 3 is a block diagram showing a first embodiment of an image processing apparatus for extracting lines by using the Hough transform in accordance with the present invention.

In FIG. 3, the reference numeral 10 designates a camera. An image signal outputted from the camera 10 is supplied to an edge extraction unit 12. The edge extraction unit 12 forms an edge image from the image signal, and stores it into an image memory 14. A processor array control unit 18 commands an image read unit 16 to sequentially read out the image data stored in the image memory 14. Each processor element PE of a processor array 20 is arranged in such a fashion that it has one-to-one correspondence with a quantization point (accumulator cell) of the Hough space. In other words, each processor element has one-to-one correspondence to a line in the image space. All the processor elements PE operate in parallel under the control of the processor array control unit 18. That is, the processor array 20 functions as a massively parallel processing system.

Figure 4:
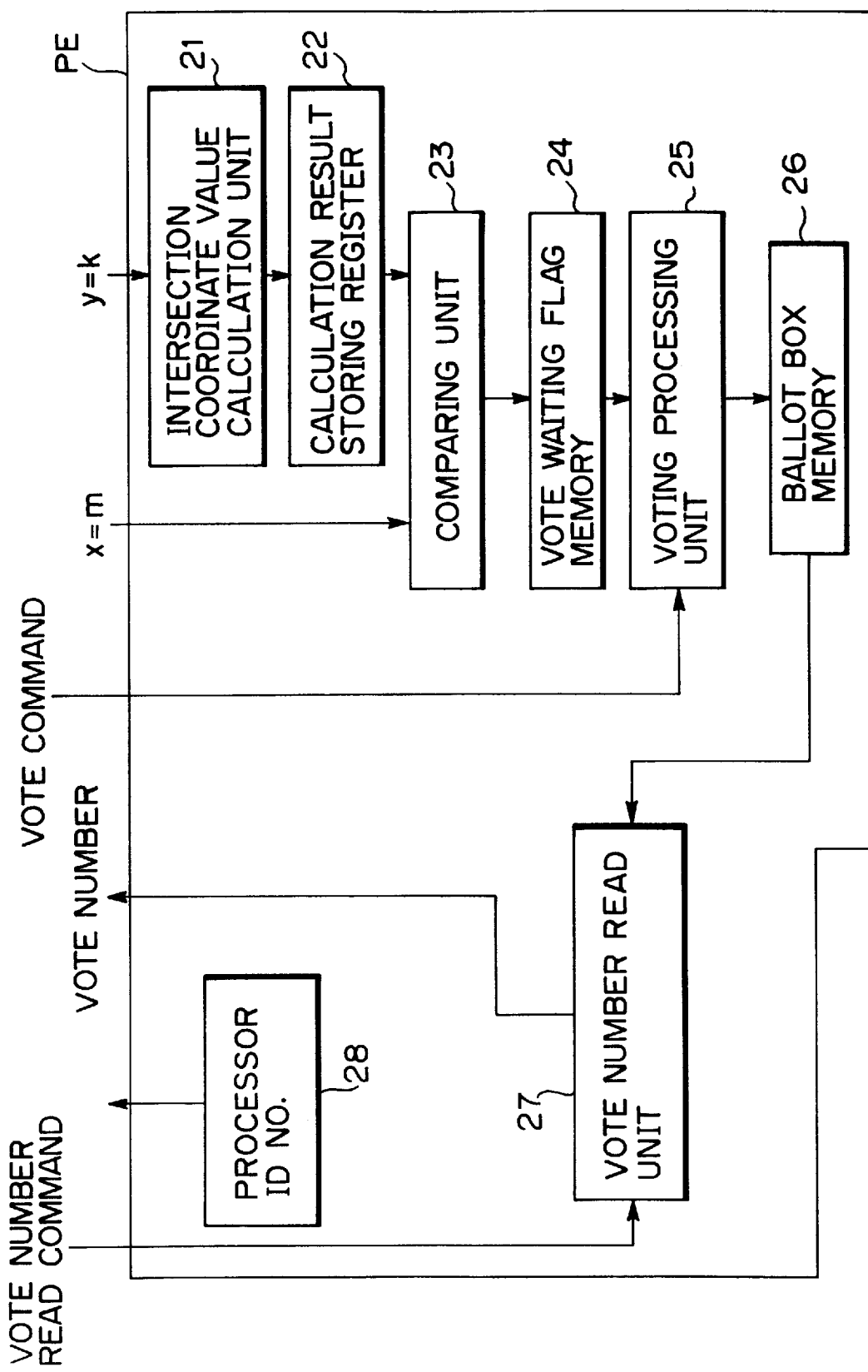
FIG. 4 is a block diagram showing a processor element of FIG. 3.

FIG. 4 is a block diagram showing an arrangement of an individual processor element PE. First, the processor array control unit 18 provides a first input terminal of a comparing unit 23 in the processor element PE with a coordinate value x=m of a black pixel. Here, the black pixels in an image constitute objects of the Hough transform. They are detected, for each scanning line of the image data, by the processor array control unit 18 which begins the detection from the leftmost point of the scanning line. The x coordinate value m of the detected black pixel is supplied to all the processor elements PE at the same time.

On the other hand, a second input terminal of the comparing unit 23 is provided with a coordinate value x of an intersection to be compared with the coordinate value of the black pixel m. The intersection coordinate value x is calculated by an intersection coordinate value calculation unit 21. Specifically, the intersection coordinate value calculation unit 21 calculates the intersection coordinate values (x, k) between the current scanning line y=k and the line corresponding to this processor element PE by the following equation obtained by changing equation (1).

$$X = \rho/\cos\theta - k\tan\theta \quad (2)$$

The calculation result is stored into a calculation result storing register 22, and is supplied to the second input terminal of the comparing unit 23. Thus, the coordinate values of all the intersections of the scanning line which is being processed with the lines corresponding to respective processor elements PE are obtained at the same time. It must be emphasized here that the calculation for obtaining the intersection coordinate values is completed once for all per scanning line.

The comparing unit 23 compares the intersection coordinate value x with the black pixel coordinate value m, and decides agreement or disagreement of the two values. Agreement of the coordinate values means that the black pixel is present on the line corresponding to this processor element PE, which in turn indicates that the processor element should cast a vote to the ballot box of this processor element PE. In this case, the flag of a vote waiting flag memory 24 is set on. In contrast with this, disagreement of these coordinate values indicates that the black pixel is not located on the corresponding line, and hence, the voting should not be carried out, and the vote waiting flag memory 24 is not set on. Here, the number of votes at each processor element PE does not exceed one because the current scanning line intersects the corresponding line once or less.

After completing the comparing processings of all the black pixels on the current scanning line, the voting processing unit 25 performs voting in response to a voting command from the processor array control unit 18. Specifically, the voting processing unit 25 of each processor element PE including the vote waiting flag memory 24 which has been set increments the content of a ballot box memory 26. Thus, finishing the processings of the entire image, the processor array control unit 18 provides a vote number read unit 27 of each processor element PE with a vote number read command to read the vote number, and detects peaks of the vote numbers. Then, the processor array control unit 18 outputs, as the extracted lines, lines corresponding to processor elements which provide the peak values. The processor elements PE are identified by the processor array control unit 18 in accordance with the processor identification signal from a processor identification signal generator 28.

Next, the operation of the embodiment will be described with reference to FIGS. 3–5.

Figure 5:
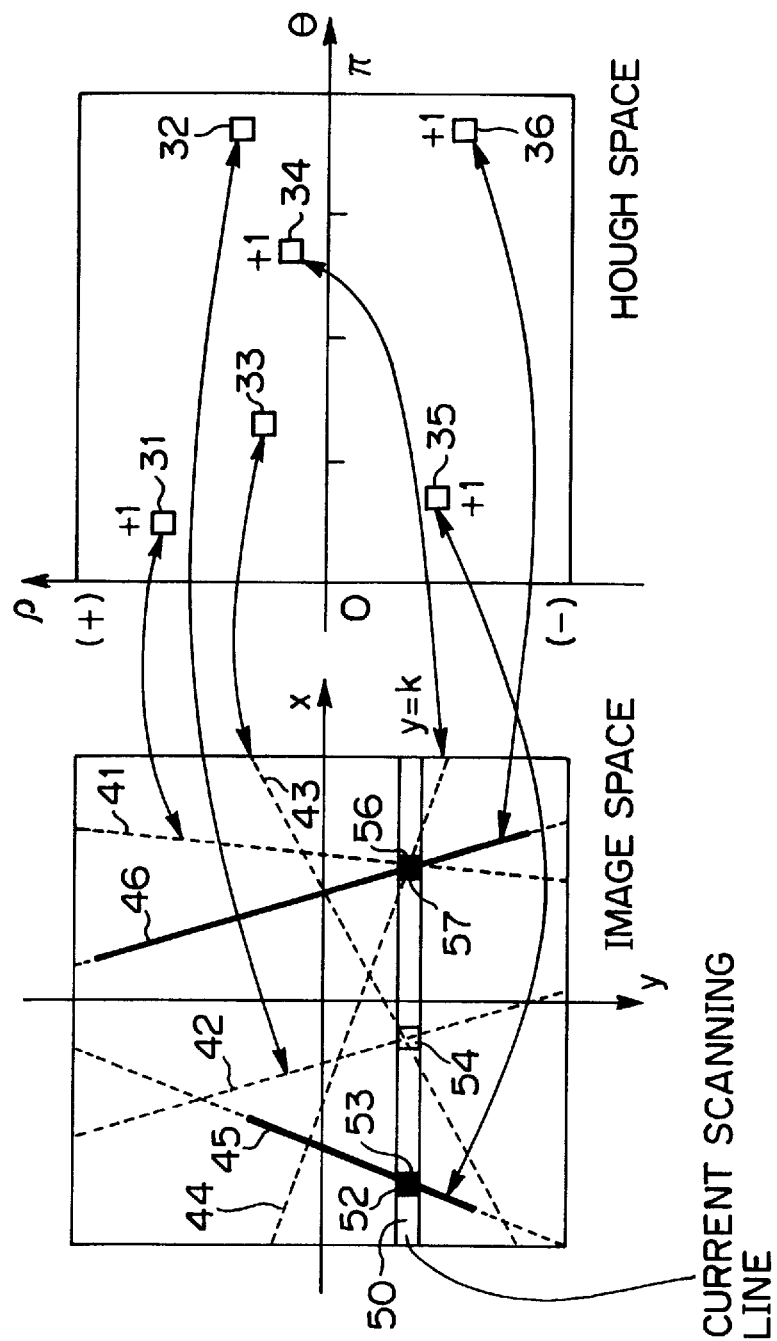
FIG. 5 is a diagram showing an example of the Hough transform in the first embodiment.

FIG. 5 is a schematic diagram illustrating the Hough transform in accordance with the present invention. In this figure, the reference numerals 31–36 designate accumulator cells in the Hough space. The accumulator cells 31–36 are each provided with a processor element PE, and correspond to the lines 41–46 on the image space, respectively. In other words, the lines 41–46 are corresponding lines of the processor elements PE assigned to the accumulator cells 31–36, respectively.

The processor array control unit 18 provides the intersection coordinate value calculation units 21 of all the processor elements PE with information on the scanning line 50 (y=k) to be processed from now on. All the processor elements PE simultaneously calculate the intersection coordinate values at which their corresponding lines intersect the scanning line y=k. For example, the processor element PE corresponding to the accumulator cell 35 obtains the intersection 52 of its corresponding line 45 and the scanning line 50, and stores the intersection coordinate value into the calculation result storing register 22. Here, the x coordinate value of the intersection of the line (ρi, θj) and the k-th scanning line y=k is given by the following equation derived from equation (2).

$$X=(\rho i/\cos \theta j)-k \tan \theta j \qquad (3)$$

Accordingly, once the x coordinate values at which corresponding lines (ρi, θj) intersect the initial scanning line are obtained, the intersections of the following scanning lines and the lines (ρi, θj) can be obtained by all the processor elements PE all at once by only adding −tanθj sequentially. For example, the processor elements PE assigned to the accumulator cells 31–36 can simultaneously obtain the x coordinate values of the intersections 52, 54 and 56 of the k-th scanning line and the corresponding lines 41–46.

Subsequently, the processor array control unit 18 decides, for each pixel on the k-th scanning line, that is, for each pixel from the coordinate values (−N/2, k) to ((N/2)−1, k) on the image space, whether its pixel value is zero or not. If the pixel value is not zero, that is, if it is a black pixel which is an object of the Hough transform, its x coordinate value m is supplied to the comparing units 23 of all the processor elements PE. In an example shown in FIG. 5, since the pixels 53 and 57 are black pixels to be subject to the Hough transform, their x coordinate values are sequentially supplied to the comparing unit 23 of the entire processor elements PE.

The comparing unit 23 of each processor element PE compares the x coordinate value m of the black pixel with the x coordinate value x of the intersection, and sets the flag of the vote waiting flag memory 24 if the two x coordinate values agree with each other. This operation is also performed by all of the processor elements PE at the same time. In the example of FIG. 5, since the intersections 52 and 56 of the lines 45, and 41, 44 and 46 with the k-th scanning line agree with the black pixels 53 and 57, the processor elements PE of the accumulator cells 35, and 31, 34 and 36 corresponding to these lines set the flags of their own vote waiting flag memories 24.

After completing the processing of the k-th scanning line, the processor elements PE whose vote waiting flags have been set increment the values of their ballot box memory 26 by one, followed by the clearing of the vote waiting flag memory 24 of the entire processor elements PE. After all the scanning lines have been processed in a similar manner, the Hough data are obtained as the values stored in the ballot box memory 26 of the entire processor elements PE. The processor array control unit 18 detects peaks of the Hough transform data, thereby extracting lines corresponding to the processor elements PE having the peak values.

EMBODIMENT 2

Figure 6:
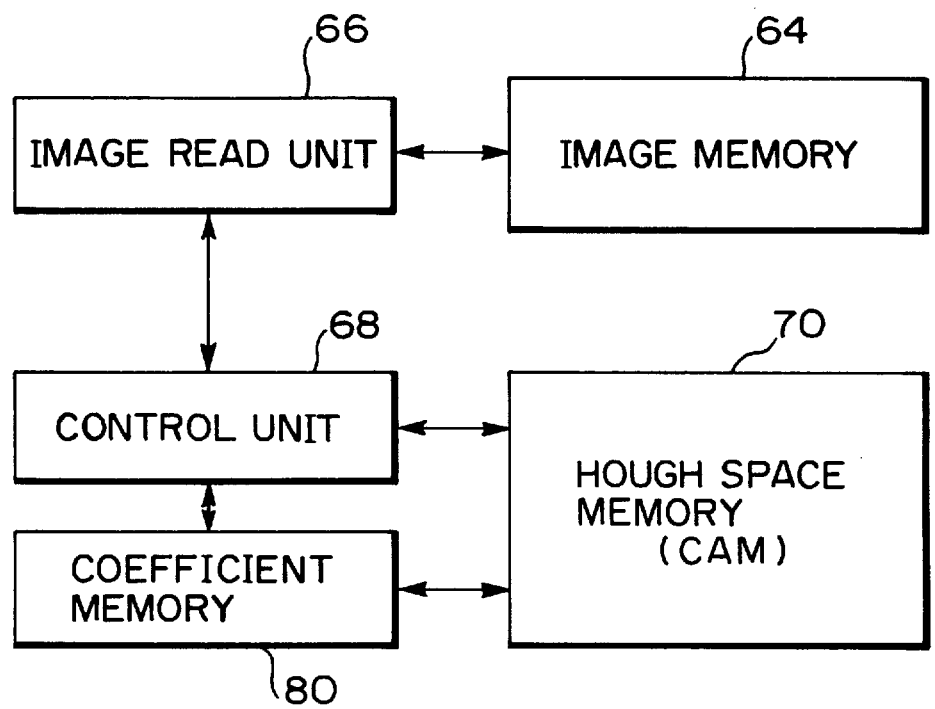
FIG. 6 is a block diagram showing a second embodiment of an image processing apparatus for extracting lines by using the Hough transform in accordance with the present invention.

FIG. 6 is a block diagram showing a second embodiment of an image processing apparatus for extracting lines by using the Hough transform in accordance with the present invention. This embodiment is characterized in that it utilizes a CAM (Content Addressable Memory) as a Hough space memory.

An image memory 64 and an image read unit 66 in FIG. 6 correspond to the image memory 14 and the image read unit 16 shown in FIG. 3, respectively. A control unit 68 reads out image data in the image memory 64 via the image read unit 66, extracts Hough transform object points (black pixels) on each scanning line, and calculates their coordinate values. In addition, the control unit 68 performs initial set and control of the Hough space memory 70. A coefficient memory 80 stores fixed values required for the initial set of the Hough transform memory 70. Specifically, the coefficient memory 80 stores x coordinate values (=ρi/cosθj) at which lines corresponding to the accumulator cells in the Hough space intersect the initial scanning line, and differences (−tanθj) of the x coordinate values, which should be added when a scanning line transfers to the next. These values are given by the foregoing equation (3).

The Hough transform memory 70 is implemented by a CAM, and each word of the CAM is assigned to one of the accumulator cells in the Hough space. Thus, one line in the image space is processed by one word of the CAM. In other words, the CAM is a kind of massively parallel processing unit capable of processing all the words in parallel, which makes it possible to process all the lines on the image space simultaneously in a very short time.

Figure 7:
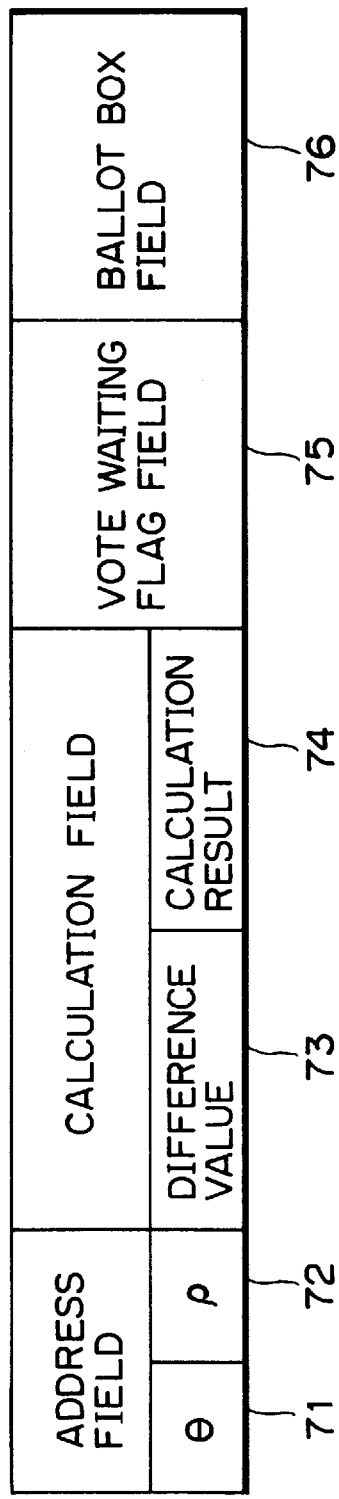
FIG. 7 is a diagram showing an arrangement of one word of a Hough space memory (CAM) of FIG. 6.

FIG. 7 shows a word structure of the CAM employed as the Hough space memory 70. First, an address field includes a θ field 71 and a ρ field 72 which store the θ address and ρ address of the accumulator cell associated with this CAM word. In other words, the address field stores the addresses corresponding to the coordinates of this accumulator cell in the Hough space coordinate system. Next, a calculation field includes a difference value field 73 and a calculation result field 74. The difference value field 73 stores a difference value involved in transferring a scanning line, that is, (−tanθj) of equation (3), and the calculation result field 74 stores the coordinate values of the intersection of the current scanning line and the line corresponding to this accumulator cell. Furthermore, the word is provided with a vote waiting flag field 75 corresponding to the vote waiting flag memory 24 in FIG. 4, and a ballot box field 76 corresponding to the ballot box 26.

The CAM 70 has the following functions in addition to the functions of a normal RAM.

(1) A function of making decision whether the content of input search data and a part of the content stored in respective words agree or not, and a function of selecting words that include the same content as search data (maskable parallel search function).

(2) A function of writing in parallel into the words selected by the maskable parallel search function (maskable parallel write function).

(3) Parallel calculation function such as addition using the maskable parallel search function and the maskable parallel write function.

Since details of these functions are described in, for example, A. Krikelis, and C. C. Weems, "Associative Processing and Processors", IEEE, Computer, 1994, and are a well-known technique, explanation thereof are omitted here.

The operation of this embodiment is as follows:

First, the CAM 70 undergoes the initial set. More specifically, the x coordinate value (ρi/cosθj), at which a line defined by the θ field 71 and the ρ field 72 intersects the initial scanning line, and the difference value (−tanθj) of the x coordinate value, which is to be added to the value (ρi/cosθj) at the transfer to the next scanning line, are transferred from the coefficient memory 80 to the calculation result field 74 and the difference value field 73, respectively.

Next, the control unit 68 commands the image read unit 66 to read out the image data of the initial scanning line from the image memory 64. The control unit 68, cooperating with the CAM 70, performs the following processings.

(1) The control unit 68, beginning from the leftmost pixel of the scanning line, sequentially detects whether a pixel on the scanning line is a black pixel (Hough transform object point) or not.

(2) When a black pixel is found, the CAM 70 searches the calculation result fields 74 using the x coordinate value of the pixel as search data, and selects words in which the x coordinate value of the intersection and the x coordinate value of the black pixel agree, the intersection being that of the scanning line and the line corresponding to the CAM word, and stored in the calculation result field 74.

(3) The CAM 70 writes "1" into the vote waiting flag field 75 of the selected words.

(4) The control unit 68 and the CAM 70 repeats the processings (1)–(3) for all the pixels on the current scanning line.

(5) After completing the above processings (1)–(4) in connection with the current scanning line, the CAM 70 adds one to the value of the ballot box field 76 of each word whose vote waiting flag field 75 has been set at one.

(6) The control unit 68 transfers the processing to the next scanning line. First, the CAM adds the difference value in the difference value field 73 to the content of the calculation result field 74 of each CAM word. Thus, the coordinate value of the intersection of the new scanning line and the line corresponding to the accumulator cell is stored in the calculation result field 74. This operation is carried simultaneously in all the CAM words. This addition is performed by using the adding function of the CAM, and the present invention is characterized in that the coordinate values of all the intersections can be obtained all at once by the single addition per scanning line. Since the adding operation of a CAM is usually performed in bit serial fashion, its operation normally takes several tens of time as that of the search operation. Accordingly, reducing the number of adding operations per scanning line makes it possible to greatly reduce the processing time of the Hough transform.

(7) The CAM 70 updates the value of the ballot box field 76 of each CAM word by repeating the foregoing processings (1)–(6).

After thus completing the processing of the entire image by repeating the foregoing processings, the control unit 68 searches for accumulator cells in which the values in the ballot box fields 76 take peak values, thereby extracting lines in the image space.

EMBODIMENT 3

Next, an embodiment where a single processor element performs voting processings of four associated accumulator cells, which makes it possible to shrink the hardware. Although the processor elements are mounted in the range of $0 \leq \theta < \pi$ in the first and second embodiments, this embodiment mounts processor elements only in the range of $0 \leq \theta < \pi/4$.

Figure 8:
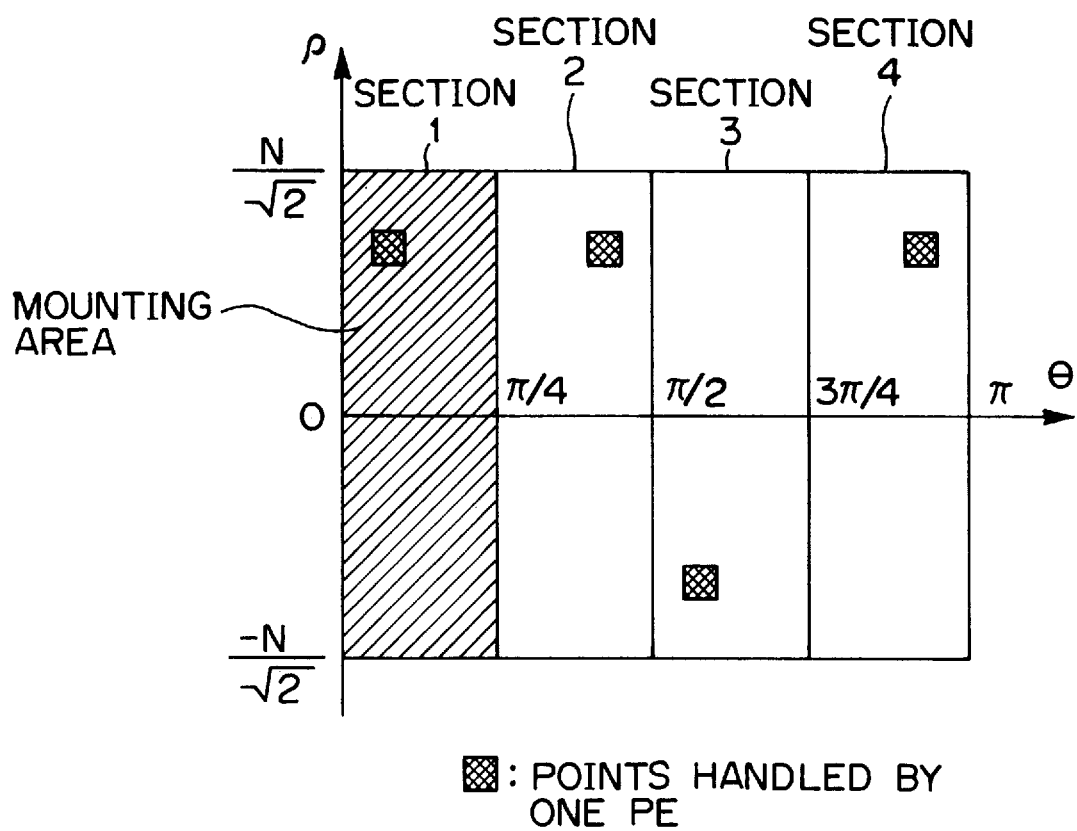
FIG. 8 is schematic diagram showing an example of dividing Hough space relating to a third embodiment of an image processing apparatus for extracting lines by using the Hough transform in accordance with the present invention.

FIG. 8 shows the mounting range of processor elements in the present embodiment. The Hough space is divided into four sections at every π/4 interval: a first section, a second section, a third section, and a fourth section, and processor elements are mounted only on the first section (the shaded portion of FIG. 8). The individual accumulator cells in the first section correspond to one of the lines whose θ are present in the range of 0 to π/4 among all the lines in the image space. Likewise, the individual accumulator cells in the second, third and fourth sections correspond to one of the lines whose θ are present in the range of π/4 to π/2, π/2 to 3π/4, and 3π/4 to π, respectively, among all the lines in the image space. Thus, the accumulator cells of respective sections correspond to lines whose slopes are in specific ranges among all the lines on the entire image space.

Figure 9:
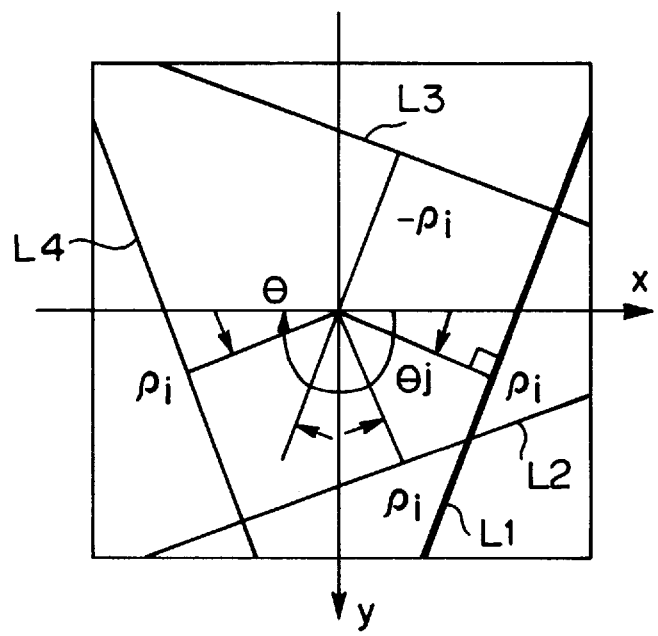
FIG. 9 is a diagram illustrating relationships of four corresponding lines in respective sections of FIG. 8.

FIG. 9 shows associated four lines handled by the same processor element PE. In FIG. 9, a line L1 corresponds to an accumulator cell (ρi, θj) in the first section, whose angle θ is in the range of $0 \leq \theta < \pi/4$. A line L2, which is associated with the line L1, corresponds to an accumulator cell (ρi, π/2−θj) in the second section, whose angle (π/2−θ) is in the range of $\pi/4 \leq (\pi/2−\theta) < \pi/2$. A line L3, which is associated with the line L1, corresponds to an accumulator cell (−ρi, π/2+θj) in the third section, whose angle (π/2+θ) is in the range of $\pi/2 \leq (\pi/2+\theta) < 3\pi/4$. A line L4, which is associated with the line L1, corresponds to an accumulator cell ($\rho i$, $\pi-\theta j$) in the fourth section, whose angle ($\pi-\theta$) is in the range of $3\pi/4 \leq (\pi-\theta) < \pi$. It should be noted that only $\rho$ in the third section has a negative sign.

As will be seen from FIG. 9, the line L2 in the second section and the line L1 in the first section are symmetrical with respect to the line y=x. In addition, the line L3 in the third section and the line L2 in the second section are symmetrical with respect to the x axis. Moreover, the line L4 in the fourth section and the line L1 in the first section are symmetrical with respect to the y axis.

Figure 10:
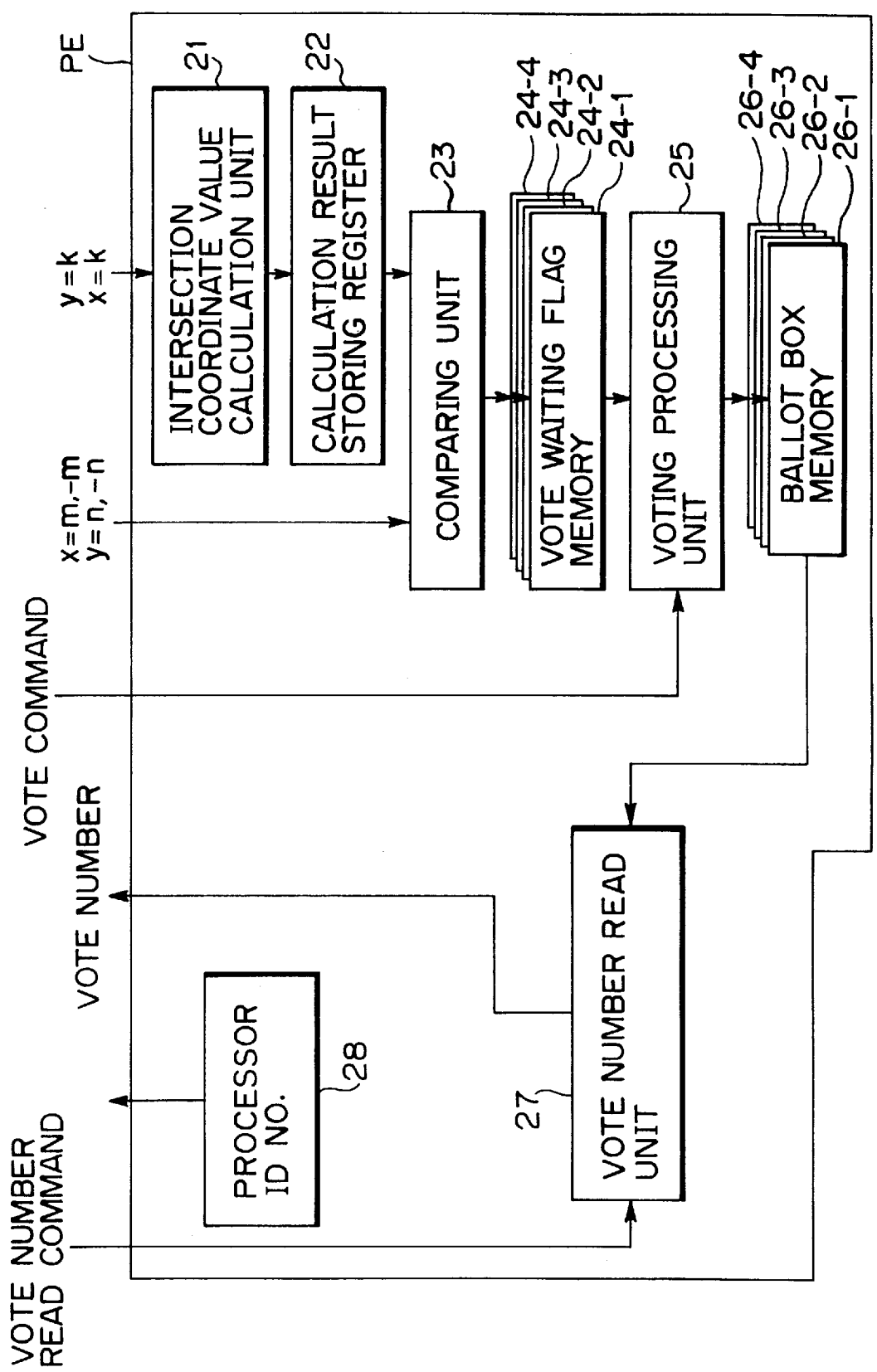
FIG. 10 is a block diagram showing a processor element used in the third embodiment of an image processing apparatus for extracting lines by using the Hough transform in accordance with the present invention.

FIG. 10 is a block diagram showing a processor element PE($\rho$, $\theta$) corresponding to an accumulator cell ($\rho,\theta$) in the first section. The processor element PE differs from the one shown in FIG. 4 in the following points.

(1) The processor element is disposed on each accumulator cell only in the first section. No processor elements are disposed on the accumulator cells in the second to fourth sections.

(2) The processor element PE includes four vote waiting flag memories: a first vote waiting flag memory 24-1, a second vote waiting flag memory 24-2, a third vote waiting flag memory 24-3, and a fourth vote waiting flag memory 24-4. Likewise, the processor element PE includes four ballot box memories: a first ballot box memory 26-1, a second ballot box memory 26-2, a third ballot box memory 26-3, and a fourth ballot box memory 26-4. The processor element PE($\rho,\theta$) of the first section also performs vote processing of the accumulator cell ($\rho,\pi/2-\theta$) in the second section, that of the accumulator cell ($-\rho,\pi/2+\theta$) in the third section, and that of the accumulator cell ($\rho,\pi-\theta$) in the fourth section (see, FIG. 8). In this processing, the four vote waiting flag memories from the first to fourth vote waiting flag memories 24-1–24-4, and the four ballot box memories from the first to fourth ballot box memories 26-1–26-4 are necessary. With such an assignment, the calculation processing becomes much simpler than the calculation processings of the first and second embodiment. This is also one of the features of the present invention, and the details thereof will be described later.

Figures 11A, 11B:
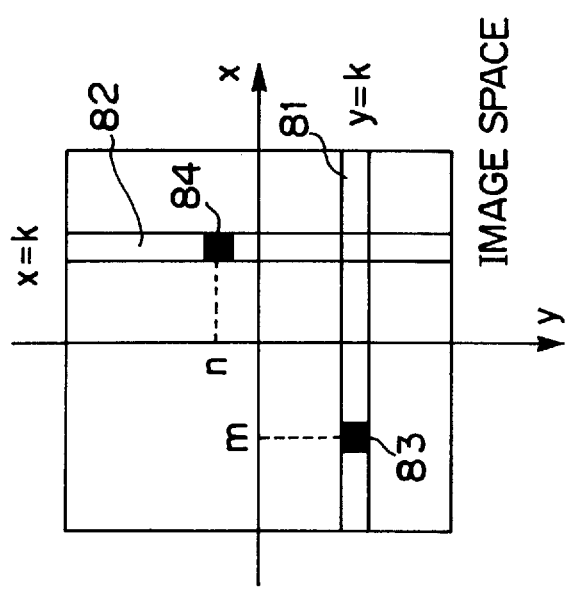
FIGS. 11A and 11B are schematic diagrams illustrating the outline of voting processings in the third embodiment.

The processor array control unit 18 of the present embodiment, on the other hand, differs from that of FIG. 3 in the following points:

(1) The search for black pixels in the image space and the vote processing are carried out in the order as shown in FIG. 11A. First, voting processings of the first and fourth sections are carried out with respect to a horizontal scanning line 81 (y=k). Specifically, every time a black pixel 83 (x=m) is found on the horizontal scanning line 81 (y=k), the voting processing of the first section and that of the fourth section are repeated, thereby completing the processings with regard to the horizontal scanning line 81. Subsequently, voting processings of the second and third sections are performed with respect to a vertical scanning line 82 (x=k). Specifically, every time a black pixel 84 (y=n) is found on the vertical scanning line 82 (x=k), the voting processing of the second section and that of the third section are repeated, thereby completing the processings with regard to the vertical scanning line 82.

(2) In the above-mentioned voting processings, when the black pixel 83 (x=m) is found on the horizontal scanning line 81, the first input terminal of the comparing unit 23 of each processor element PE($\rho,\theta$) is provided with m for the first section, and with −m for the fourth section. On the other hand, when the black pixel 84 (y=n) is found on the vertical scanning line 82, the first input terminal of the comparing unit 23 of each processor element PE($\rho,\theta$) is provided with n for the second section, and with −n for the third section. FIG. 11B illustrates these relationships.

The purpose of thus changing the input to the comparing unit 23 is for minimizing an amount of a calculation increase involved in transferring the sections. Details of this will now be described.

First, voting processing of the first section in this embodiment is performed in the same manner as that of the first embodiment. First, every time the horizontal scanning line 81 is changed, each processor element PE($\rho$, $\theta$) obtains the coordinate values ($\alpha$, k) of the intersection of the new horizontal scanning line 81 (y=k) and the line corresponding to the accumulator cell ($\rho$, $\theta$). The calculation of the intersection coordinates is performed once per each scanning line as described before. Subsequently, the processor array control unit 18 searches, beginning from the leftmost pixel on the horizontal scanning line 81, for a black pixel, and obtains the x coordinate value m of the black pixel 83. Then, each processor element PE compares the x coordinate value $\alpha$ of the intersection with the x coordinate value m of the black pixel 83, and sets the first vote waiting flag memory 24-1 to one if the two x coordinate values agree.

The coordinate value $\alpha$ of the intersection is obtained by using the following equation.

$$\alpha = \rho/\cos\theta - k\tan\theta \qquad (4)$$

It should be noted here that the coordinate value $\alpha$ can be calculated by only adding the difference ($-\tan\theta$) every time the horizontal scanning line 81 is altered.

Next, the processor element PE($\rho$, $\theta$) performs voting processing in terms of the accumulator cell ($\rho$, $\pi-\theta$) in the fourth section. In this case, the coordinate value x of the intersection of the line corresponding to the accumulator cell and the scanning line 81 is given by the following equation.

$$x = \rho/\cos(\pi-\theta) - k\tan(\pi-\theta)$$

Reducing this equation gives the following equation:

$$-x = \rho/\cos\theta - k\tan\theta \qquad (5)$$

It should be noted that the right-hand side of equation (5) agrees with the right-hand side of equation (4). In other words, the value $\alpha$ obtained in terms of the first section can be utilized without change. Only, since the left-hand side is ($-x$), agreement of $\alpha$ and the x coordinate value m of the black pixel 83 is tested by comparing ($-m$) obtained by reversing the sign of m with the value ($-x$).

Figure 12:
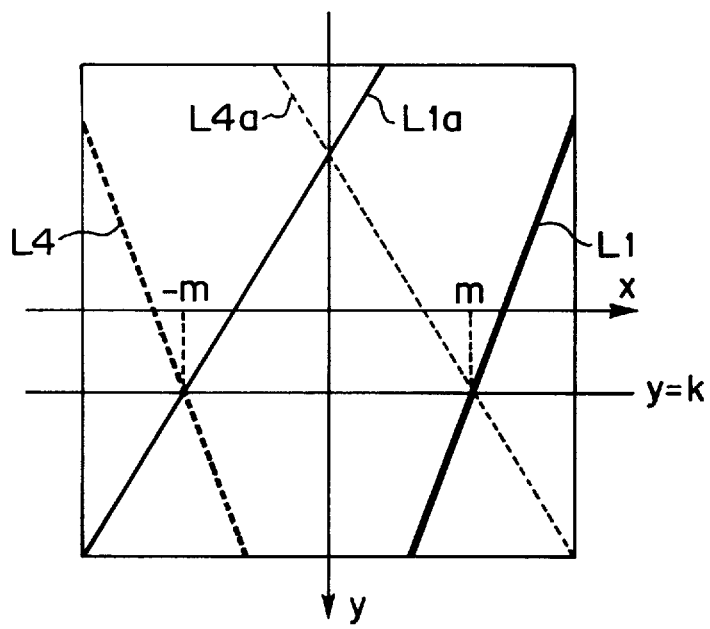
FIG. 12 is a diagram illustrating voting processings to the sections 1 and 4 in the third embodiment.

FIG. 12 is a diagram illustrating the above-described relationship. A line L1($\rho$, $\theta$) in the first section, which is handled by the processor element PE($\rho$, $\theta$), and a line L4($\rho$, $\pi-\theta$) in the fourth section are symmetrical with respect to the y axis. Accordingly, the line L4a in the fourth section, which corresponds to a line L1a in the first section which intersects the scanning line y=k at x=−m, intersects the scanning line y=k at x=m without fail. Thus, the line L4a in the fourth section corresponding to the line L1a in the first section passes through the black pixel (m, k), and hence, the line L4a is a line to receive a vote. As a result, the fourth vote waiting flag memory 24-4 of the accumulator cell associated with the line L1a corresponding to the line L4a is set to one.

Next, the voting processing of the second and third sections will be described. The coordinate value $\alpha$ of the intersection obtained in connection with the first section can also be applied to these sections. To achieve this, the voting processings must be performed along the vertical scanning line 82 (x=k) as shown in FIG. 11A. Specifically, voting of the second and third sections is performed when the coordinate values (k, α) of the intersection of the vertical scanning line 82 and the line corresponding to each accumulator cell agree with the coordinate values (k, n) of a black pixel. The following is a reason why the coordinate values (k, α) of the intersection are applicable to the accumulator cell (ρ, π/2−θ) in the second section which corresponds to the accumulator cell (ρ, θ) in the first section. First, the y coordinate value of an intersection in the second section can be calculated using the following equation which is derived from equation (1).

$$y = \rho/\sin(\pi/2-\theta) - k \cot(\pi/2-\theta)$$

Reducing this equation gives $$y = \rho/\cos\theta - k\tan\theta \qquad (6)$$

The right-hand side of equation (6) agrees with that of equation (4). Accordingly, the value α calculated in connection with the first section can be applied to the right-hand side without change. Only, since the left-hand side of equation (6) is y, the agreement between the y coordinate value n of the black pixel 84 and the value y of equation (6) can be checked by providing n to the first input terminal of the comparing unit 23.

Figure 13:
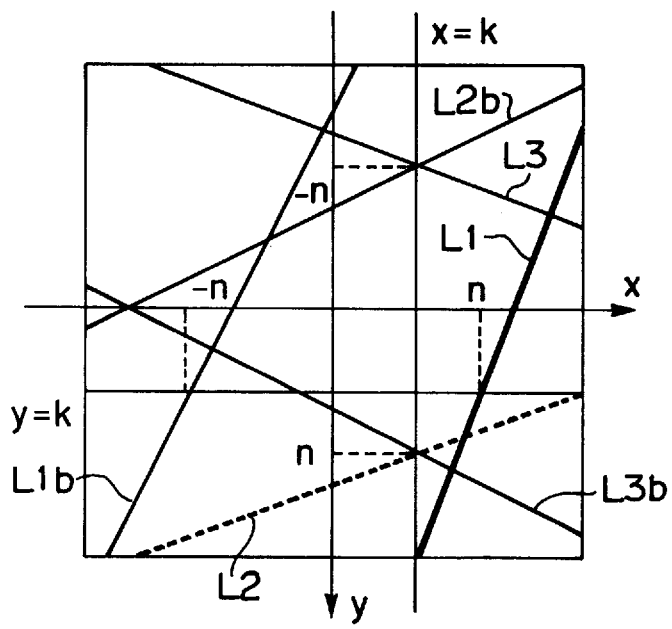
FIG. 13 is a diagram illustrating voting processings to the sections 2 and 3 in the third embodiment.

FIG. 13 is a diagram illustrating the above-described relationship. The line L1(ρ, θ) in the first section, which is handled by the processor element PE(ρ, θ), and a line L2(ρ, π/2−θ) in the second section are symmetrical with respect to the line y=x. Accordingly, the line L2 in the second section intersects the scanning line x=k at y=n without fail. Thus, the line L2 in the second section corresponding to the line L1 in the first section passes through the black pixel (k, n), and hence, the line L2 is a line to receive a vote. As a result, the second vote waiting flag memory 24-2 of the accumulator cell associated with the line L1 corresponding to the line L2 is set to one.

Next, with regard to the accumulator cell (−ρ, π/2+θ) in the third section corresponding to the accumulator cell (ρ, θ) in the first section, the coordinate values (k, y) of the intersection can be obtained by the following equation.

$$y = \rho/\sin(\pi/2+\theta) - k \cot(\pi/2+\theta)$$

Reducing this equation gives $$-y = -\rho/\cos\theta - k\tan\theta \qquad (7)$$

The right-hand side of equation (7) agrees with that of equation (4) by replacing −ρ with ρ. Accordingly, the value α calculated in connection with the first section can be applied to the right-hand side of equation (7) by replacing ρ with −ρ. Only, since the left-hand side of equation (7) is −y, the agreement between the y coordinate value n of the black pixel 84 and the value y of equation (7) can be checked by providing −n to the first input terminal of the comparing unit 23.

FIG. 13 is a diagram illustrating the above-described relationship. The line L1(ρ, θ) in the first section, which is handled by the processor element PE(ρ, θ), and a line L3(ρ, π/2+θ) in the third section have no direct symmetrical relation. The line L3 and the line L2 in the second section, however, are symmetrical with respect to the x axis.

Accordingly, a line L2b in the second section corresponding to a line L1b in the first section, which intersects the scanning line y=k at x=−n, intersects the scanning line x=k at y=−n, and hence, a line L3b in the third section corresponding to these lines intersects the scanning line x=k at y=n without fail. Thus, the line L3b in the third section corresponding to the line L1b in the first section passes through the black pixel (k, n), and hence, the line L3b is a line to receive a vote. As a result, the third vote waiting flag memory 24-3 of the accumulator cell associated with the line L1b corresponding to the line L3b is set to one.

Figure 14B:
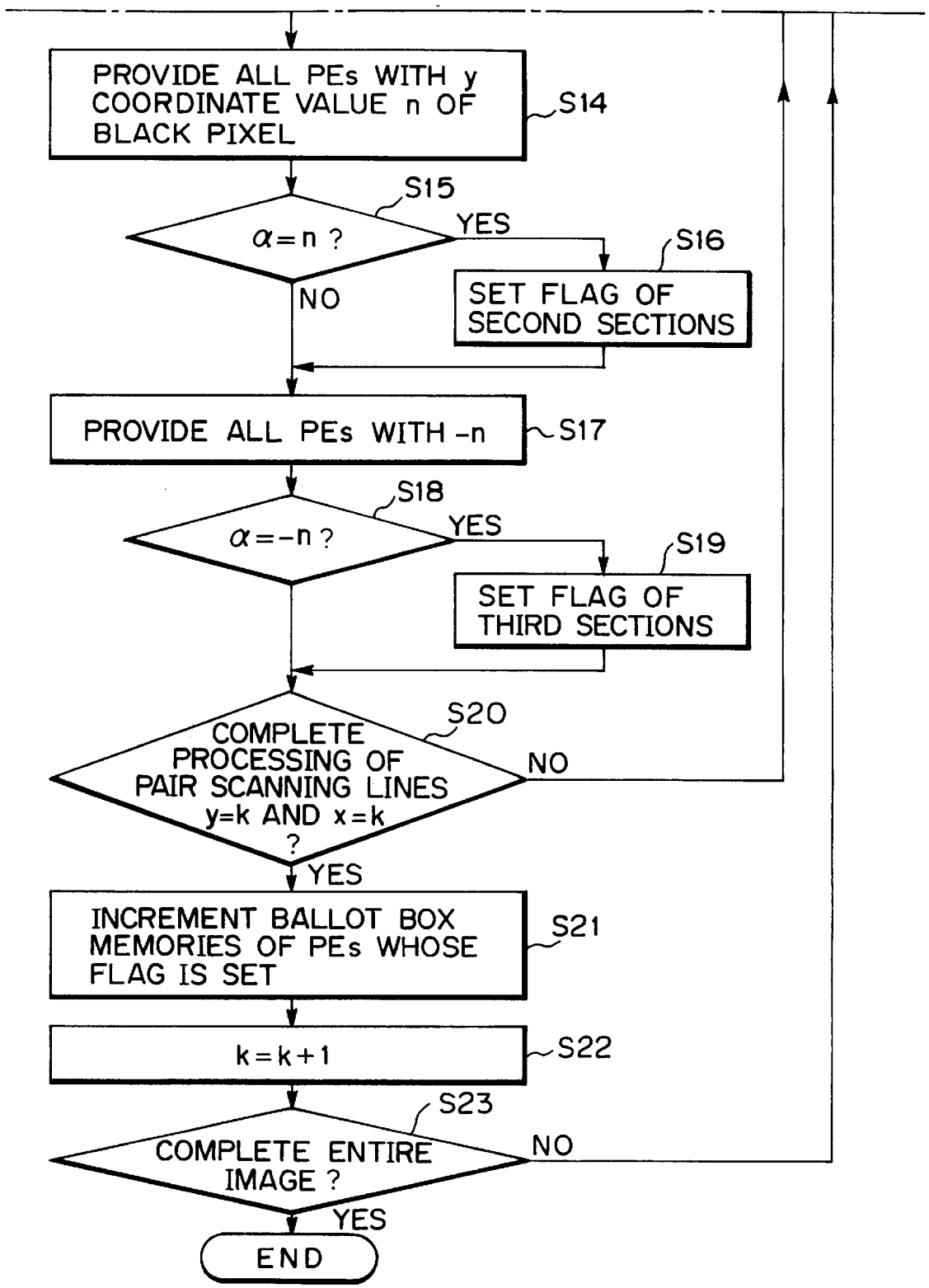

FIGS. 14A and 14B are flowcharts illustrating the operation of this embodiment.

First, at step S1, k is set at k=−N/2. This corresponds to designating the initial horizontal scanning line in the image space (see, FIG. 2A). Subsequently, at step S2, each of the processor elements PE calculates the coordinate values (α, k) of intersection of its own corresponding line and the horizontal scanning line y=k by using the intersection coordinate value calculation unit 21, and stores the result into the calculation result storing register 22.

The processor array control unit 18 sequentially searches for a black pixel on the scanning line y=k at step S3, and provides all the processor elements with the x coordinate value m of the black pixel at step S4. The comparing unit 23 of each processor element PE compares the x coordinate value α of the intersection and the x coordinate value m of the black pixel at step S5. When they agree, voting to the first section is performed at step S6, that is, the vote waiting flag memory 24-1 is set to one.

Next, at step S7, the processor array control unit 18 supplies all the processor elements with the value −m which is obtained by inverting the sign of the x coordinate value m of the black pixel. Then, the comparing unit 23 of each processor element PE compares the x coordinate value α of the intersection with −m at step S8. When they agree, voting to the fourth section is performed at step S9, that is, the vote waiting flag memory 24-4 of the processor element is set to one.

After thus completing the voting processings of the first and fourth sections for a particular black pixel on the horizontal scanning line y=k, the processings from step S3 to S9 are repeated for the next black pixel. Then, after completing all the processings of the horizontal scanning line y=k at step S10, processings of the vertical scanning line x=k is started. Specifically, the processor array control unit 18 sequentially searches for a black pixel on the vertical scanning line x=k at step S13, and provides all the processor elements with the y coordinate value n of the black pixel at step S14. The comparing unit 23 of each processor element PE compares the y coordinate value α of the intersection with the y coordinate value n of the black pixel at step S15. When they agree, voting to the second section is performed at step S16, that is, the vote waiting flag memory 24-2 of the processor element is set to one.

Next, at step S17, the processor array control unit 18 supplies all the processor elements with the value −n which is obtained by inverting the sign of the y coordinate value n of the black pixel. Then, the comparing unit 23 of each processor element PE compares the y coordinate value α of the intersection with −n at step S18. When they agree, voting to the third section is performed at step S19, that is, the vote waiting flag memory 24-3 of the processor element is set to one.

After thus completing the voting processings of the second and third sections for a particular black pixel on the vertical scanning line x=k, the processings from step S13 to S19 are repeated for the next black pixel. Then, after completing the processings of the pair scanning lines y=k and x=k (step S20), all the processor elements, whose vote waiting flag memories have been set to one, increment their ballot box memories by one at step S21. Subsequently, the processor array control unit 18 increments k at step S22, makes decision whether or not the processings of the entire image have been completed at step S23, and proceeds to the next scanning lines until the processings of the entire image is completed.

Although this embodiment uses processor elements PE similar to those of the first embodiment, this embodiment can be implemented by employing a CAM similar to that of the second embodiment.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processing apparatus for extracting a line in an image space by using a Hough transform to map the line from the image space onto one of a plurality of points in a Hough space, said image processing apparatus comprising:

a plurality of processor elements each being respectively assigned to one of a plurality of accumulator cells of the Hough space, each of said plurality of accumulator cells corresponding to a respective one of the plurality of points in the Hough space; and means for sequentially reading image space pixels on a scanning line in the image space, the sequential reading means determining whether or not a pixel being read from among said image space pixels is a Hough transform object point having a value other than zero, the sequential reading means obtaining coordinate values of the image space pixel when the pixel is the Hough transform object point, the sequential reading means supplying the coordinate values of the image space pixel to respective ones of said plurality of processor elements;

wherein each of said plurality of processor elements includes:

a ballot box memory for storing a number of votes;

means for obtaining, for each of a plurality of scanning lines, coordinate values of an intersection of a respective scanning line and a line in image space corresponding to the plurality of processor elements;

means for comparing coordinate values of said Hough transform object point with the coordinate values of said intersection, and storing data as a comparison result as to whether there is coincidence or non-coincidence between the Hough transform object point coordinate values and the intersection coordinate values; and means for providing a vote to said ballot box memory when the Hough transform object point coordinate values are coincident with the intersection coordinate values, the vote being provided after the comparison result has been obtained for each pixel on said scanning line;

wherein after each of the plurality of scanning lines of the image space have been processed, a line is extracted which corresponds to the processor element whose ballot box memory has a maximum number of votes.

2. The image processing apparatus as defined by claim 1, wherein said plurality of processor elements are provided in a single associative memory having a plurality of words;

wherein the single associative memory comprises a random access memory and determines whether retrieval data provided thereto is coincident with contents stored in at least one of the plurality of words, the single associative memory selecting a word from memory which is coincident with the retrieval data, the single associative memory writing data into at least one selected word in parallel, and providing a parallel calculation function;

at least one word of the single associative memory corresponding to a respective one of said plurality of processor elements each of which corresponds to at least one point of the Hough space; and wherein said at least one word includes a plurality of memory cells which constitute the ballot box memories and which store data when there is coincidence between the retrieval data and the stored contents, and for obtaining coordinate values of an intersection.

3. An image processing apparatus for extracting a line in an image space by using a Hough transform to map a line from the image space represented by $\rho = x\cos\theta + y\sin\theta$ onto a point $(\rho, \theta)$ in Hough space (where $\rho$ is a length of a chord from an origin of the image space perpendicular to the line, and $\theta$ is an angle of the chord from a positive X axis in image space), said apparatus comprising:

a plurality of processor elements respectively corresponding to a plurality of Hough quantization points in a first section of the Hough space, the Hough space being divided into the first section ($0 \leq \theta < \pi/4$), a second section ($\pi/4 \leq \theta < \pi/2$), a third section ($\pi/2 \leq \theta < 3\pi/4$), and a fourth section ($3\pi/4 \leq \theta < \pi$) in accordance with a value of $\theta$, means for sequentially reading pixels on a first scanning line along an X-axis in the image space, and determining whether one pixel being read from among said pixels along said X-axis is a Hough transform object point having a value other than zero, and, when the pixel along said X-axis is the Hough transform object point, obtaining an X-axis coordinate value of 'm' and a value of '−m', obtained by inverting a sign of the coordinate value of 'm', and supplying the X-axis coordinate values to respective ones of said plurality of processor elements;

means for sequentially reading pixels on a second scanning line along a Y-axis in the image space, and determining whether one pixel being read from among said pixels along said Y-axis is a Hough transform object point having a value other than zero, and, when the pixel along said Y-axis is the Hough transform object point, obtaining a Y-axis coordinate value of 'n' and a value of '−n', by inverting a sign of the coordinate value 'n', and supplying the Y-axis coordinate values to respective ones of said plurality of processor elements;

each of the plurality of processor elements (i, j) including four Hough quantization ballot box memories having a first ballot box ($\rho i, \theta j$), a second ballot box ($\rho i, (\pi/2) - \theta j$), a third ballot box ($-\rho i, (\pi/2) + \theta j$) and a fourth ballot box ($\rho i, \pi - \theta j$) wherein $0 \leq \theta j < \pi/4$;

means for calculating coordinate values of an intersection of a line for each of said plurality of processor elements and a scanning line defined by y=k;

first memory means for comparing and determining coincidence between the coordinate value 'm' of the Hough transform object point and the intersection coordinate values, and storing the result of the determination as a first comparison result;

fourth memory means for comparing and determining coincidence between the value '−m' and the intersection coordinate values, and storing the result of the determination as a fourth comparison result;

second memory means for comparing and determining coincidence between the coordinate value 'n' of said Hough transform object point and the intersection coordinate values, and storing the result of the determination as a second comparison result;

third memory means for comparing and determining coincidence between the value '−n' and the intersection coordinate values, and storing the result of the determination as a third comparison result; and means for voting to a first ballot box memory when coincidence is determined by and stored in said first memory means, voting to a second ballot box memory when coincidence is determined by and stored in said second memory means, voting to a third ballot box memory when coincidence is determined by and stored in said third memory means, and voting to a fourth ballot box memory when coincidence is determined by and stored in said fourth memory means, said voting being performed after the comparison results have been obtained for all pixels on the first and second scanning lines; and wherein a line is extracted which corresponds to a processor element from among said plurality of processor elements whose ballot box memory has a maximum number of votes.

4. The image processing apparatus as defined by claim 3, wherein said plurality of processor elements are provided in a single associative memory having a plurality of words;

wherein the single associative memory comprises a random access memory and determines whether retrieval data provided thereto is coincident with contents stored in at least one of the plurality of words, the single associative memory selecting a word therefrom which is coincident with the retrieval data, the single associative memory writing data into at least one selected word in parallel, and providing a parallel calculation function;

wherein plural sets of words of said associative memory are used as said plurality of processor elements each of which corresponds to four quantization points in the Hough space; and wherein each of said plural sets of words includes four ballot box memory cells which function as said first ballot box memory, said second ballot box memory, said third ballot box memory and said fourth ballot box memory, each of said plural sets of words including four comparison result memory cells for respectively storing the first, second, third and fourth comparison results, and one memory cell for storing, retrieving and calculating the coordinate values of the intersection.

5. An image processing method for extracting a line in an image space by using a Hough transform to map a line from the image space onto one of a plurality of points in a Hough space, said method utilizing a plurality of processor elements respectively assigned to a respective one of a plurality of accumulator cells of the Hough space, each of said plurality of accumulator cells corresponding to a respective one of the plurality of points in the Hough space, the method comprising the steps of:

sequentially reading image space pixels on a scanning line in the image space;

determining whether or not a pixel being read from among said image space pixels is a Hough transform object point having a value other than zero;

obtaining coordinate values of the image space pixel when the pixel is the Hough transform object point;

supplying the coordinate values of the image space pixel to respective ones of said plurality of processor elements;

obtaining, in each of the plurality of processor elements, for each of a plurality of scanning lines, coordinate values of an intersection of a respective scanning line and a line in image space corresponding to the plurality of processor elements;

comparing, in each of the plurality of processor elements, the Hough transform object point coordinate values with the intersection coordinate values;

storing, in each of the plurality of processor elements, data as a comparison result as to whether there is coincidence or non-coincidence between the Hough transform object point coordinate values and the intersection coordinate values;

voting, in each of the plurality of processor elements, to a ballot box memory when the Hough transform object point coordinate values are coincident with the intersection coordinate values after the comparison result has been obtained for each pixel on the scanning line; and extracting after all the scanning lines of the image space have been processed, a line which corresponds to the processor element whose ballot box memory has a maximum number of votes.

6. An image processing method for extracting a line in an image space by using a Hough transform to map a line from the image space as represented by $\rho = x\cos\theta + y\sin\theta$ onto a point $(\rho, \theta)$ in Hough space (where $\rho$ is a length of a chord from an origin of the image space perpendicular to the line, and $\theta$ is an angle of the chord from a positive X axis in the image space), said method utilizing a plurality of processor elements respectively corresponding to a plurality of Hough quantization points in a first section of Hough space, the Hough space being divided into the first section ($0 \leq \theta < \pi/4$), a second section ($\pi/4 \leq \theta < \pi/2$), a third section ($\pi/2 \leq \theta < 3\pi/4$), and a fourth section ($3\pi/4 \leq \theta < \pi$) in accordance with a value of $\theta$, each of the plurality of processor elements (i, j) including four Hough quantization ballot box memories having a first ballot box ($\rho i, \theta j$), a second ballot box ($\rho i, (\pi/2)-\theta j$), a third ballot box ($-\rho i, (\pi/2)+\theta j$) and a fourth ballot box ($\rho i, \pi-\theta j$) wherein $0 \leq \theta j < \pi/4$, the method comprising the steps of:

sequentially reading pixels on a first scanning line along an X-axis in the image space, and determining whether one pixel being read from among said pixels along said X-axis is a Hough transform object point having a value other than zero, and, when the pixel along said X-axis is the Hough transform object point, obtaining an X-axis coordinate value of 'm' and a value of '−m', by inverting a sign of the coordinate value of 'm', and supplying the X-axis coordinate values to respective ones of said plurality of processor elements;

sequentially reading pixels on a second scanning line along a Y-axis in the image space, and determining whether one pixel being read from among said pixels along said Y-axis is a Hough transform object point having a value other than zero, and, when the pixel along said Y-axis is the Hough transform object point, obtaining a Y-axis coordinate value of 'n' and a value of '−n' by inverting a sign of the coordinate value 'n', and supplying the Y-axis coordinate values to respective ones of said plurality of processor elements;

calculating coordinate values of an intersection of a line for each of said plurality of processor elements and a scanning line defined by y=k;

comparing and determining in a first memory, coincidence between a coordinate value 'm' of the Hough transform object point and the coordinate values of the intersection, and storing the result of the determination as a first comparison result;

comparing and determining in a fourth memory, coincidence between a value '−m' and the intersection coordinate values, and storing the result of the determination as a fourth comparison result;

comparing and determining in a second memory, coincidence between a coordinate value 'n' of the Hough transform object point and the intersection coordinate values, and storing the result of the determination as a second comparison result;

comparing and determining in a third memory, coincidence between a value '−n' and the intersection coordinate values, and storing the result of the determination as a third comparison result; and voting to a first ballot box memory when coincidence is determined by and stored in said first memory, voting to a second ballot box memory when coincidence is determined by and stored in said second memory, voting to a third ballot box memory when coincidence is determined by and stored in said third memory, and voting to a fourth ballot box memory when coincidence is determined by and stored in said fourth memory, said voting being performed after the comparison results have been obtained for all pixels on the first and second scanning lines; and extracting a line which corresponds to a processor element from among said plurality of processor elements whose ballot box memory has a maximum number of votes.

\* \* \* \* \*